3,247,197
TETRAHYDRO-3:6-DIODO-1:2-OXAZINES
Ernst Gaeumann and Vladimir Prelog, Zurich, Hans Bickel, Binningen, and Ernst Vischer, Basel, Switzerland, assignors to Ciba Corporation, New York, N.Y., a corporation of Delaware
No Drawing. Filed July 2, 1963, Ser. No. 292,443
Claims priority, application Switzerland, Sept. 25, 1959, 78,652/59, 78,653/59; Mar. 18, 1960, 3,063/60, 3,064/60; Oct. 11, 1960, 11,395/60; Nov. 23, 1960, 13,147/60; Apr. 7, 1961, 4,075/61; Apr. 26, 1961, 4,885/61; June 29, 1961, 7,598/61; Aug. 10, 1961, 9,409/61; Aug. 11, 1961, 9,451/61; July 6, 1962, 8,185/62

3 Claims. (Cl. 260—244)

This is a continuation-in-part application of our application Serial No. 144,325, filed October 11, 1961, now abandoned, which is itself a continuation-in-part of our application Serial No. 57,834, filed September 22, 1960, now U.S. Patent No. 3,153,621.

In the above main applications the isolation of the ferrioxamines in pure or enriched form from plant organisms is described. In addition there is shown that the ferrioxamines are organic compounds containing nitrogen and iron, the latter can be eliminated by treating the red-colored solution containing a ferrioxamine, with a mineral acid or a strong alkali. There is obtained a colorless solution containing a desferri-ferrioxamine. By treatment of such colorless solution with ferric chloride the typical color of the ferrioxamines returns.

Now it was found that the desferri-ferrioxamines are 7,18,29 - trihydroxy - 8,11,19,22,30 - pentaoxo - 1,7,12,18, 23,29 - hexaaza - triacontanes. Desferri-ferrioxamine B is the 30-methyl derivative, desferri-ferrioxamine G. is the 30-($\beta$-carboxyethyl)-derivative, desferri-ferrioxamine $D_1$ the 1 - acetyl-30-methyl-derivative of 7,18,29-trihydroxy-8,11,19,22,30 - pentaoxo-1,7,12,18,23,29-hexaaza-triacontane and desferri-ferrioxamine E is the 33 - membered, cyclic compound in which the carboxyl group at the end of 30-($\beta$-carboxyethyl)-7,18,29-trihydroxy-8,11,19,22,30-pentaoxo-1,7,12,18,23,29-hexaaza-triacontane is combined with the $N_1$-atom.

The present invention concerns trihydroxamic acids of the Formula I

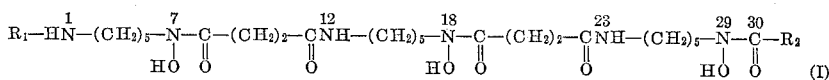

in which $R_1$ stands for hydrogen, an acyl radical or an unsubstituted or substituted hydrocarbon radical, CO—$R_2$ represents an acyl radical or $R_1$ and CO—$R_2$ together stand for the radical of a dicarboxylic acid of which the second carboxyl group is combined with the $N_1$-atom, the O-acyl derivatives, the salts and metal complexes of said compounds.

An acyl radical $R_1$ or CO—$R_2$ is for example an aliphatic acyl radical, preferably an alkanoyl or alkenoyl radical, e.g., the formyl, acetyl, propionyl, butyryl, valeryl, stearyl, or oleyl radical, or a substituted alkanoyl radical, for example a free or functionally converted, e.g., esterified succinyl or glutaryl radical or an amino acid radical, preferably one of a natural $\alpha$-amino acid, e.g., the glycyl, alanyl, valyl or leucyl radical, also an aroyl or aralkanoyl radical, for example, an unsubstituted or substituted benzoyl radical, e.g., the salicyl, p-hydroxy-benzoyl, p-aminosalicyl, p-methoxy-benzoyl, p-ethoxy-benzoyl, p-ethoxy-ethoxy-benzoyl, p-ethoxy-polyethyleneoxy-benzoyl radical, a naphthoyl, a free or esterfied phthaloyl, a carbobenzoxy or phenylacetyl radical. When $R_1$ stands for a hydrocarbon radical then it is preferably an aryl radical, especially the m-dinitro-phenyl radical.

The trihydroxamic acids of the Formula I are, if $R_1$ is not an acyl radical, bases, which form salts with acids. For preparing such salts there come into consideration preferably therapeutically acceptable acids, either inorganic acids, for example hydrohalic acids, e.g. hydrochloric or hydrobromic acid, also perchloric, nitric or thiocyanic acid, sulfuric or phosphoric acids, or organic acids, such for example as formic, acetic, propionic, glycollic, lactic, pyruvic, oxalic, malonic, succinic, maleic, fumaric, malic, tartaric, citric, ascorbic, hydroxymaleic or dihydroxymaleic acid, benzoic, phenylacetic, 4-aminobenzoic, 4-hydroxy-benzoic, anthranilic, cinnamic, mandelic, salicylic, 4-amino-salicylic, 2-phenoxy-benzoic, 2-acetoxy-benzoic acid, methane sulfonic, ethane sulfonic, hydroxyethane sulfonic, benzene sulfonic, p-toluene sulfonic or sulfanilic acid, methionine, tryptophane, lysine or arginine.

The O-unsubstituted compounds are also of acidic character and therefore form salts with bases. The latter are preferably those of therapeutically acceptable alkali or alkaline earth metals, e.g., of sodium, potassium or calcium or of organic bases, for example aliphatic amines. The O-unsubstituted compounds also form metal complexes. Preferred metals for the latter are such as are physiologically tolerable, preferably iron, cobalt or magnesium, also copper or antimony.

Owing to their capacity to form very stable complexes with metals, e.g., the above shown metals, the compounds of Formula I have valuable pharmacological properties. For example, they inhibit the deposition of iron-containing pigments in the tissues or, in the case of a deposition of iron in the organism, they cause the iron to be excreted, for example, in haemochromatosis and haemosiderosis and also in cases of cirrhosis of the liver. They may also be used for excreting other metals, for example, copper, from the organism. The metal complexes of these compounds, more especially the iron and cobalt complexes have antianaemic properties, and they can thus be used as medicaments, for example, for the treatment of hemorrhagic anaemia and iron deficiency anaemia. The above compounds may also be used as starting materials or intermediates for the preparation of other valuable products.

Particularly valuable compounds are those of Formula I, in which $R_1$ and $R_2$—CO stand for acyl radicals which are independent of each other, $R_1$ represents also hydrogen or an unsubstituted or substituted hydrocarbon radical and among these compounds primarily those of formula I in which $R_1$ has the meaning given and $R_2$—CO stands for acetyl or free or esterfied succinyl, their salts with therapeutically acceptable acids or organic amines, alkali- or alkaline earth metal hydroxides. Especially valuable compounds are the desferri-ferrioxamines B, G and $D_1$ and their salts of the last-mentioned kind.

The trihydroxamic acids mentioned at the beginning, their salts and metal complexes may be obtained for example synthetically. Such synthesis consists in combining 3 mols of 1-amino-5-hydroxylamino-pentane, 2 mols of succinic acid and one mol of a carboxylic acid or a compound which is convertible into one of these compounds, for example one that contains protecting groups or reactively converted functional groups, to form a compound of the Formula I, and, if desired, in a resulting compound having a terminal free amino group and a carboxyl group, condensing these groups intramolecularly to form a ring, and if desired, introducing or splitting off at any desired stage the acyl group or the hydrocarbon radical $R_1$, and/or exchanging the radical $R_2$—CO, and/or forming or splitting off the O-acyl group and/or, if desired, esterifying any free carboxyl group in a resulting compound and/or forming the free compounds, the salts and/or metal complexes of these compounds.

The starting materials mentioned may be condensed in succession, or individual radicals may be condensed together, and the resulting constituent parts then combined to form the entire chain or the ring.

Compounds convertible into 1-amino-5-hydroxylaminopentane are, for example, pentanes of the formula $$Z_1-CH_2-CH_2-CH_2-CH_2-CH_2-Z_2$$

wherein $Z_1$ and $Z_2$ represent an amino group and a radical convertible into a hydroxylamino group, respectively, or, conversely, a radical convertible into an amino group and a hydroxylamino group, respectively.

Radicals convertible into an amino or hydroxylamino group are, for example, reactive esterified hydroxyl groups, e.g., hydroxyl groups esterified with hydrohalic acids or sulfonic acids which on reaction with ammonia or hydroxylamine yield the amino or hydroxy amino group; furthermore, groups that can be converted into the amino or hydroxylamino group by reduction, e.g., the nitro group, the hydroxylimino group, or the nitrile group. Above all, the groups convertible into the amino or hydroxyl amino group comprise the amino or hydroxylamino groups protected by radicals that can be split off by hydrolysis or reduction. Such protective groups are, for example, acyl groups, especially carbobenzoxy, phthaloyl, trifluoroacetyl groups, primarily the tertiary butyloxycarbonyl group, and also, e.g., the tosyl and trityl radicals. These protective groups can be split off in known manner by treatment with hydrolyzing or hydrogenolyzing agents.

Compounds convertible into succinic acid or the second carboxylic acid are for example the halides, anhydrides, azides, imides, imidazolides or esters of succinic acid or the second carboxylic acid.

Any carboxyl group not participating in the reaction is protected advantageously by esterification, e.g., with methanol, benzyl alcohol or para-nitro-benzyl alcohol.

When the condensation involves the free carboxyl groups, it is preferable to use a condensing agent, e.g., a carbodiimide, such as dicyclohexylcarbodiimide.

The synthesis of the trihydroxamic acids is advantageously performed according to this diagram of formulae:

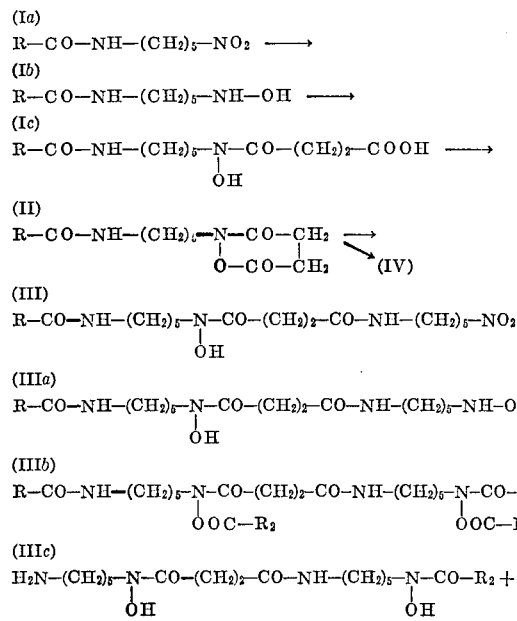

R—CO stands for an acyl group.

Like the Compound Ib, the product mentioned under IIIa can also be converted in stages into the dihydroxamic acid and then into the trihydroxamic acid IV.

In this novel process, it has been found to be of particular advantage to form the N-substituted tetrahydro-3,6-dioxo-1,2-oxazines mentioned under II. These latter can be obtained from the compounds mentioned under Ic by treatment with a condensing agent, e.g., a carbodiimide, such as dicyclohexyl-carbodiimide. By this treatment, in a single process step, the terminal carboxyl group of the compounds mentioned under Ic is converted to form a reactive group, and the N-hydroxyl group is protected.

The trihydroxamic acids mentioned at the beginning or their salts may also be obtained when a metal complex of a compound of the Formula I, in which $R_1$ and CO—$R_2$ have the meanings given above, especially an iron complex, is treated with a mineral acid, a strong alkali or a complex forming substance, e.g., 8-hydroxyquinoline, and the resulting metal-free compound is isolated, and, if desired, at any stage of the procedure the acyl group or the hydrocarbon radical $R_1$ is introduced or split off and/or the radical CO—$R_2$ is exchanged and/or an O-acyl group is formed or split off and/or, if desired, in a resulting compound having a free carboxyl group, such group is esterified and/or the free compound or a salt is formed.

In reacting the metal complexes mentioned with mineral acids, especially hydrochloric acid, it is preferable to extract first the metal, e.g., iron, from the aqueous acid solution my means of a suitable solvent, for example, ether, then to render the solution nearly neutral, and then to extract the metal-free compound with a solvent, e.g., n-butanol.

When a solution containing the metal complex is treated with a strong alkali, the metal usually separates as the hydroxide in the form of fine flakes and can be isolated, for example, by filtration or centrifuging. After that, upon neutralization or slight acidification of the solution, the metal-free compound can be extracted as described above.

When a complex forming substance is used to remove the metal, for example, 8-hydroxy-quinoline, the reaction is preferably performed in a lower alkanol, such as methanol. The precipitated metal complex is separated and any excess precipitant, such as 8-hydroxy-quinoline extracted from the aqueous solution, e.g., with chloroform, for example, after concentrating the filtrate.

In the resulting trihydroxamic acid any free 1-amino group present may be acylated, for example, with an acid anhydride in a buffered alcoholic solution or with an acid halide in an aqueous, weakly alkaline medium. Any O-acyl derivatives formed can be converted into the O-unsubstituted $N_1$-acyl compounds, e.g., by means of ammonia. The substitution of the 1-amino group by a hydrocarbon radical, e.g., the m-dinitrophenyl radical, or the exchange of the radical CO-$R_2$ can be performed in per se conventional manner.

N-acyl radicals that can be split off hydrogenolytically, for example the carbobenzoxy radical, can be split off in known manner at any stage. A free carboxyl group in a resulting compound, e.g., in desferri-ferrioxamine G, can be esterified by a method known in peptide chemistry.

There can be used as starting materials natural ferrioxamines and derivatives obtainable therefrom, for example, the $N_1$-$R_1$ compounds obtainable from the ferrioxamine B or G, in which $R_1$ has the meaning given above, or the derivatives of ferrioxamine G or its $N_1$-$R_1$-compounds having an esterified terminal carboxyl group, or the compounds obtained by total synthesis. The substitution of the 1-amino group of ferrioxamine B or G is performed in the usual manner. The $N_1$-acyl compounds are obtained, for example, by reacting said ferrioxamines with an acid anhydride in alcoholic solution. The free terminal carboxyl group is ferrioxamine G or its $N_1$-acyl derivatives can be esterified by the usual methods. The esterification is advantageously performed with diazo compounds.

Depending on the procedure followed, the compounds are obtained in the free form or in the form of their salts. From the salts the free compounds can be obtained in the per se conventional manner. Likewise, the free compounds can be converted into the aforementioned acid addition salts or, if desired, into the alkali metal or alkaline earth metal salts or the salts of organic bases.

The O-unsubstituted compounds are converted into the metal complex by reacting them with a corresponding metal salt, for example, the salt of a mineral acid, such as a metal chloride, sulfate or nitrate, or the salt of an organic acid, such as a metal acetate or metal sulfonate, or by reacting them with a metal alcoholate, for example, a metal ethylate.

The invention also comprises those modifications of the process in which there is used as starting material an intermediate product obtainable at any stage of the complete process and the remaining step or steps is/are carried out, or the process is discontinued at any stage, or the starting materials are formed under the reaction conditions or are used in the form of their salts. Thus, for example, in intermediate products with free hydroxyl or carboxyl groups, such groups can be acylated or esterified.

The new starting materials and intermediate compounds also form part of the present invention.

The compounds mentioned at the beginning can be used in the form of pharmaceutical preparations which contain said compounds in admixture with an organic or inorganic pharmaceutical excipient suitable for enteral or parenteral application. Suitable excipients are substances that do not react with the complex compounds, such for example, as gelatine, lactose, glucose, sodium chloride, starches, magnesium stearate, talcum, vegetable oils, benzyl alcohols, gums, polyalkylene glycols, white petroleum jelly, cholesterol or other known medicinal excipients.

The pharmaceutical preparations may be, for example, tablets, dragees, powders, ointments, creams, suppositories or vials, or in liquid form solutions, suspensions or emulsions. They may be sterilized and/or may contain assistants such as preserving, stabilizing, wetting or emulsifying agents. They may also contain further therapeutically valuable substances. The new compounds can also be used in veterinary medicine, e.g., in one of the aforementioned forms.

The following examples illustrate the invention:

*Example 1*

(a)
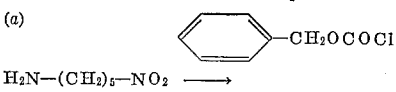
$H_2N$—$(CH_2)_5$—$NO_2$ ⟶

(I)

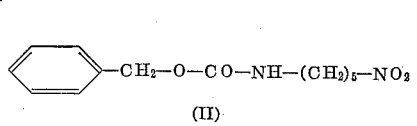

(II)

13.2 grams of 1-amino-5-nitro-pentane (I) [prepared according to H. Bickel et al., Helv. Chim. Acta, 43, 904 (1960)] are taken up in 1 liter of acetone and mixed with 1 liter of 0.1 N-sodium bicarbonate solution. While cooling with ice and stirring vigorously a solution of 17.0 grams of carbobenzoxychloride in 200 cc. of anhydrous tetrahydrofuran is slowly added and the mixture is kept for 7 hours at 0° C. On completion of the reaction the bulk of the acetone is evaporated in vacuo and the remaining aqueous solution is agitated five times with 100 cc. of chloroform on each occasion. The chloroform extracts are washed successively with a small amount of 2 N-hydrochloric acid, saturated sodium bicarbonate solution and water, dried over sodium sulfate and evaporated, to yield 25.8 grams of colorless, amorphous product II of melting point 53° C.

(b)
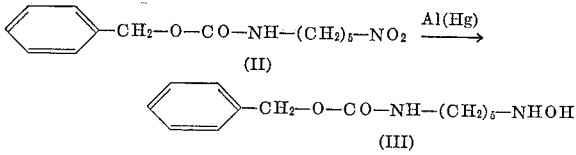

A solution of 24.0 grams of product II in 400 cc. of moist 1:2-dimethoxyethane is stirred with 60 grams of freshly prepared aluminum amalgam for 4 hours at 0° C. The aluminum oxide sludge is then filtered off and the filtrate is evaporated. As revealed by its paper chromatogram (system: toluene-n-butanol saturated with water), the evaporation residue (product of the Formula III; 16.6 grams) is substantially unitary. The substance is converted into the hydrochloride of M.P. 83–85° C. which is readily soluble in alcohol and chloroform.

From 1-benzoylamino-5-nitropentane of melting point 78° C., the 1-benzoylamino-5-hydroxylamino-pentane-hydrochloride of melting point 132–133° C. can be prepared in an analogous manner.

(c)
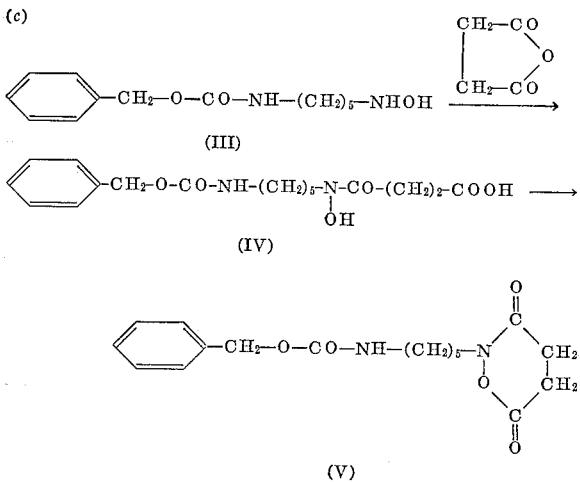

A solution of 16 grams of product III in 150 cc. of absolute pyridine is treated with 6.4 grams of succinic anhydride and the whole is kept for 15 hours at 22° C. under nitrogen. The pyridine is then evaporated in vacuo. The residue, product IV (20.5 grams), is recrystallized from a mixture of ethanol and diethyl ether, M.P. 115–116° C. By heating with dicyclohexyl-carbodiimide there is obtained product V, which after recrystallization from diethyl ether melts at 84–85° C.

In an analogous manner from 1-benzoylamino-5-hydroxylamino-pentane there is obtained 1-benzoylamino-5-(N-succinyl-hydroxylamino)-pentane melting at 114–115° C. (a compound readily soluble in alcohol and ethyl acetate and sparingly soluble in diethyl ether), and therefrom the N-(5′-benzoylamino-pentyl) - tetrahydro - 3,6-dioxo-1,2-oxazine of melting point 104–106° C.

(d)

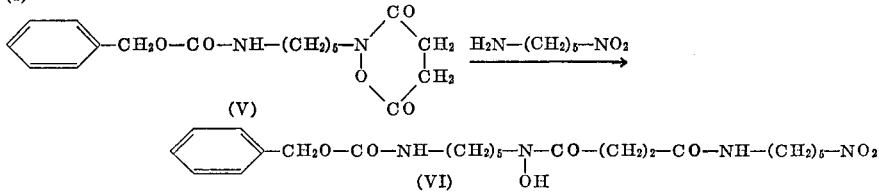

20.0 grams of product V and 80 grams of 5-nitro-1-amino-pentane are dissolved in 300 cc. of tetrahydrofuran and the whole is heated at the boil for 2½ hours under nitrogen. Evaporation in vacuo yields 27.1 grams of crude product VI, which is chromatographed on 1 kg. of silica gel. The fractions (10.3 grams) that can be eluted with a 9:1-mixture of chloroform and methanol contain considerably enriched product VI (one acid group can be titrated; ferric chloride test positive). The compound melts at 104–105° C.

viscous oil. The 5'-monoacetyl derivative may be prepared from N-(5'-benzoylamino-pentyl)-tetrahydro-3,6-dioxo-1,2-oxazine (cf. (d)) by reaction with 1-amino-5-(N-acetyl-hydroxylamino)-pentane.

(f)

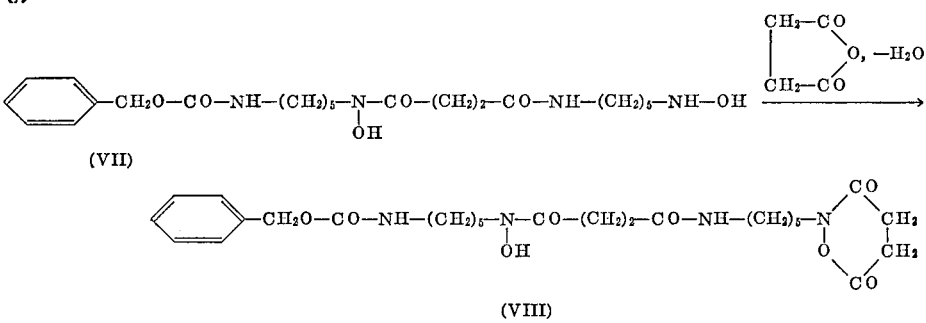

6.3 grams of product VII and 1.4 grams of succinic anhydride are reacted in 60 cc. of absolute pyridine as described above under (c). Yield: 7.4 grams of product VIII.

(g)

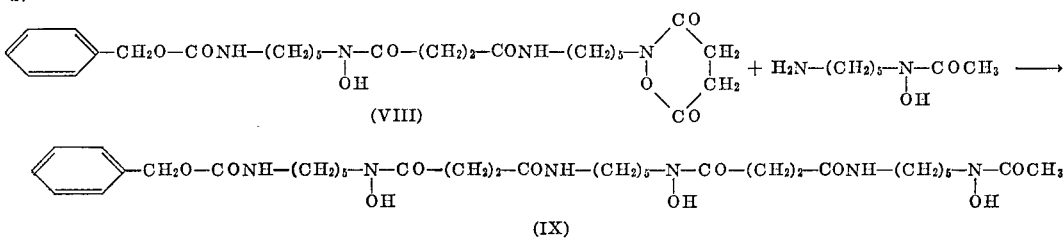

In an analogous manner from N-(5-benzoylamino-pentyl)-tetrahydro-3,6-dioxo-1,2-oxazine there is obtained 1 - benzoylamino-5-[N-(5'-nitropentylaminosuccinyl)-hydroxylamino]-pentane of M.P. 114–116° C., a compound which is readily soluble in alcohol, soluble in ethyl acetate and chloroform and sparingly soluble in diethyl ether.

When the process described above under (d) is performed with 7.3 grams of product VIII and 2.2 grams of 1-amino-5-(N-acetyl-hydroxylamino)-pentane in 100 cc. of tetrahydrofuran, there are obtained 9.4 grams of crude product IX which is chromatographed on 350 grams of silica gel. Product IX is again found in the fractions (e)

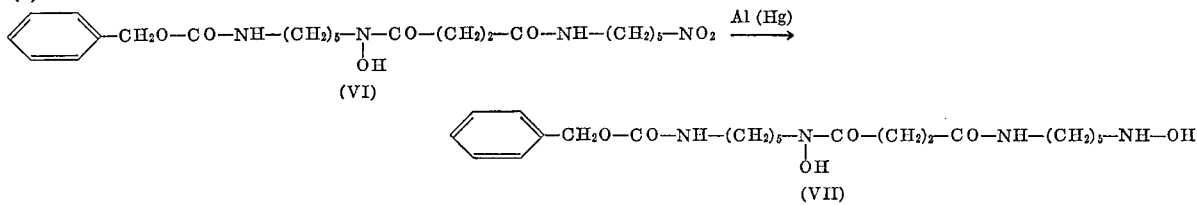

10.0 grams of product VI are reduced as described under (b) above with 30 grams of aluminum amalgam in 100 cc. of moist 1:2-dimethoxyethane. The resulting product VII (6.5 grams) is used as it is.

In an analogous manner from the corresponding 1-benzoylamino derivative there is obtained 1-benzoylamino-5-[N-(5'-hydroxylamino-pentylamino-succinyl)-hydroxylamino]-pentane whose 5'-monoacetyl derivative melts at 165° C.; the triacetyl derivative is obtained as a colorless (3.8 grams) eluted with a 7:3-mixture of chloroform and methanol.

Instead of using 1-amino-5-(N-acetyl-hydroxylamino)-pentane for the reaction, product VIII may also be reacted with 1-amino-5-(N-succinyl-monomethylester)-O-acetyl-hydroxylamino-pentane of the formula

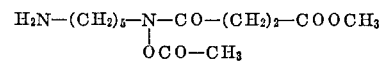

which may be prepared from product IV by esterification, acetylation and hydrogenolytic elimination of the carbobenzoxy group. The resulting product has the formula

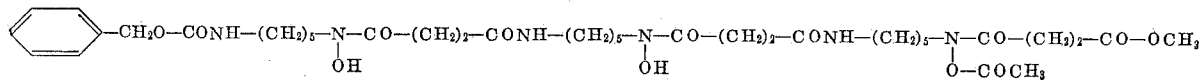

(IXa)

(h)

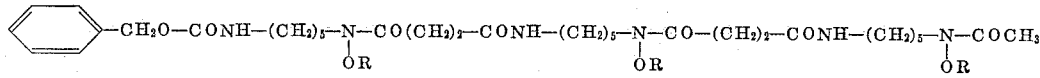

(IX) (R=H) $\xrightarrow{CH_2=C=O}$ X (R=—COCH$_3$)

A slow current of ketene is introduced for one hour into an ice-cooled solution of 3.7 grams of product IX in 200 cc. of tetrahydrofuran. The whole is then evaporated in vacuo, and the residue is taken up in 200 cc. of ethyl acetate and washed successively with a small amount of 2 N-hydrochloric acid, 2 N-sodium carbonate solution and water. The solution is dried over sodium sulfate and evaporated to leave a residue of 3.1 grams of neutral product X in the form of a colorless resin.

(i)

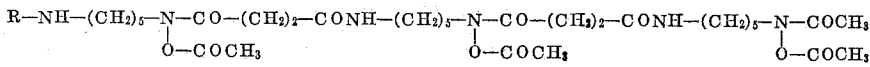

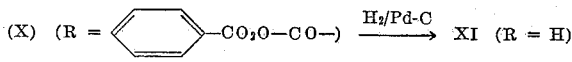

A solution of 3.0 grams of product X in 100 cc. of glacial acetic acid is hydrogenated in the presence of 300 mg. of palladium carbon of 10% strength at 22° C. When one molecular proportion of hydrogen has been taken up (after about ½ hour) the reaction is complete. Filtration and evaporation in vacuo yields 2.4 grams of product XI.

(k)

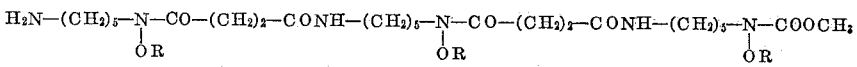

(XI)

(R=—COCH$_3$) $\xrightarrow{NH_3}$ XII (R=H)

2.3 grams of product XI are dissolved in 50 cc. of methanol saturated with ammonia at 0° C. and the solution is kept for 18 hours. Evaporation yields 2.1 grams of a powder which is extracted three times with ether, whereupon product XII is obtained as an insoluble residue (1.4 grams). For purification it is dissolved in a minimum of methanol and precipitated with diethyl ether. Product XII is 30-methyl-7,18,29-trihydroxy-8,11,19,22,30 - pentaoxo-1,7,12,18,23,29-hexaaza-triacontane whose hydrochloride melts at 171–173° C. Its acetyl derivative melts at 185° C.

Product IXa described under (g) can be further acylated as described under (h) and decarbobenzoxylated and desacetylated according to (i) and (k) to obtain the 30 - (β - carbomethoxyethyl) - 7,18,29-trihydroxy-8,11,19, 22,30 - pentaoxo - 1,7,12,18,23,29 - hexaaza - triacontane.

(l)

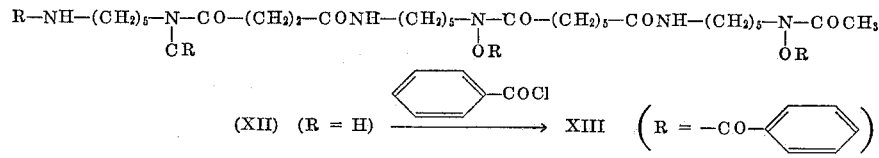

A solution of 280 mg. of product XII in 30 cc. of 0.1 N-sodium hydroxide solution is treated with 350 mg. of benzoyl chloride and the whole is agitated for 1½ hours at 0° C. The mixture is extracted five times with chloroform, dried over sodium sulfate and evaporated, to yield an oily residue which is precipitated with water from a methanolic solution (290 mg. of product XIII). For analysis the product is dried for 12 hours at 80° C. under a pressure of 0.001 mm. Hg over phosphorus pentoxide.

C$_{53}$H$_{64}$O$_{12}$N$_6$ calculated: C 65.14, H 6.60%. Found: C 65.40, H 6.55%.

(m)

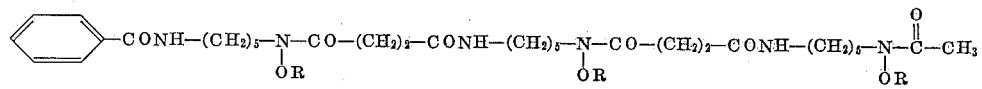

(XIII)

A solution of 275 mg. of product XIII in 25 cc. of methanolic ammonia saturated at 0° C. and the solution is kept for 16 hours, evaporated, and the residue is extracted four times with ether, whereupon product XIV (melting point 179–181° C.) insoluble in ether is recrystallized from methanol.

$C_{32}H_{52}O_9N_6$ calculated: C 57.81, H 7.88, N 12.66%. Found: C 57.61, H 8.10, N 12.45%.

According to its melting point and mixed melting point the product so obtained is identical with the corresponding hydrolysate obtained from the O:O′:O″:N-tetrabenzoyl derivative of ferrioxamine B.

Example 2

(In this example, the products identified with roman numerals are identical with those represented by formulae in Example 1.)

(a)                      I→II 4.5 grams of carbobenzoxy chloride and a solution of 2 grams of potassium hydroxide in 10 cc. of water are added dropwise while stirring at 0° C. to a mixture of 4.1 g. of 1-amino-5-nitropentane hydrochloride, 20 cc. of water and 1.43 grams of potassium hydroxide. Stirring is continued for 10 minutes, the mixture acidified slightly with hydrochloric acid, and extracted with chloroform. The chloroformic extract is washed with sodium bicarbonate solution, dried over sodium sulfate, and evaporated under reduced pressure. The residue is crystallized from a mixture of diethyl ether and petroleum ether to obtain 1-carbobenzoxyamino-5-nitropentane (II) of melting point 52–53° C. The yield is 85%.

(n)

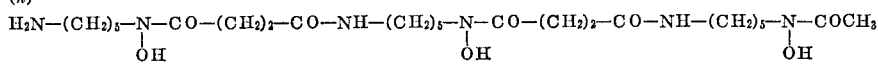

(XII)

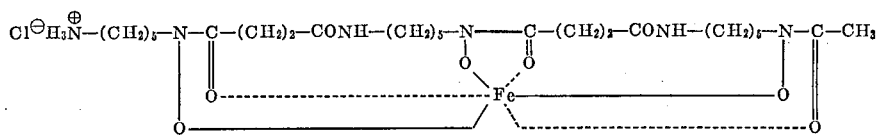

(XIII)                                                                                 ferrioxamine-B-hydrochloride 500 mg. of product XII are taken up in 100 cc. of water and treated with 400 mg. of ferric chloride containing water of crystallization ($FeCl_3 \cdot 6H_2O$) in 20 cc. of water, whereupon the coloration typical of ferrioxamine appears spontaneously. The whole is allowed to stand for 15 minutes and then agitated three times with 20 cc. of a 1:1-mixture of chloroform and phenol on each occasion. The extracts are washed with a little amount of water and treated with 200 cc. of diethyl ether, whereupon ferrioxamine B hydrochloride (XIII) forms an amorphous, reddish brown precipitate. The product is repeatedly washed with ether; in the following properties it corresponds to authentic material: Absorption spectra in the ultra-violet, visible and infra-red ranges; paperchromatogram, electrophoresis, antagonism test with ferrimycins and the N-(2:4-dinitro phenyl) derivative [see (o)].

(o)

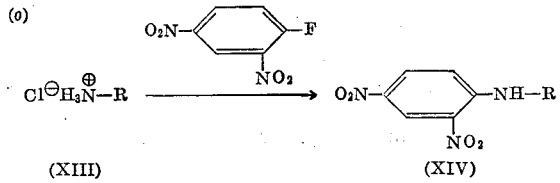

(XIII)                          (XIV)

A solution of 225 mg. of product XIII and 225 mg. of sodium bicarbonate in 15 cc. of water is treated with 225 mg. of 2:4-dinitrofluorobenzene in 15 cc. of ethanol and the mixture is kept for 5 hours at 23° C. The ethanol is then distilled off under reduced pressure, the aqueous phase is extracted twice with 30 cc. of diethyl ether on each occasion and then four times with 30 cc. of n-butanol on each occasion. The butanol extracts are washed with water and evaporated in vacuo; they contain the reddish brown complex which is taken up in acetone, freed from insoluble matter by filtration and precipitated with ether, to yield 175 mg. of an amorphous, orange powder XIV. For analytical purposes the product is reprecipitated three times and then dried at 70° C. under 0.01 mm. Hg over phosphorus pentoxide.

$C_{31}H_{47}O_{12}N_8Fe$ calculated: C 47.76, H 6.08, N 14.38, Fe 7.16%. Found: C 43.31, H 6.38, N 13.93, Fe 7.02%.

Its ultra-violet absorption spectrum likewise reveals product XIV to be identical with the analogous derivative of ferrioxamine B.

(b)                      II→III

A solution of 2 grams of compound II in 40 cc. of ethanol is treated with a solution of 3 grams of ammonium chloride in 30 cc. of water and 10 drops of concentrated aqueous ammonia, and in the course of 5–10 minutes 1.5 grams of zinc dust are added with stirring. Stirring is continued for 15 minutes, care being taken that the temperature does not exceed 30° C. The reaction mixture is then filtered through Celite, the filtrate evaporated under reduced pressure, the residue dissolved in 50 cc. of 2 N-hydrochloric acid, and the solution extracted by agitating it with ether. The aqueous phase is alkalinized with aqueous ammonia, extracted with chloroform, and the chloroformic extract dried and evaporated. When the residue is treated with ether, the resulting 1-carbobenzoxyamino-5-hydroxylamino-pentane (III) crystallizes melting point 102–104° C. Its hydrochloride melts at 83–85° C.; yield, 71%.

(c)                      III→IV

A mixture of 18.5 g. of compound III, 20 cc. of pyridine, and 1.1 grams of succinic anhydride is heated at 85° C. for an hour and a half, the pyridine then evaporated under reduced pressure, and the residue taken up in chloroform. The chloroformic solution is shaken with potassium bicarbonate solution, the latter is acidified slightly with hydrochloric acid, and extracted four times with ethyl acetate. The extract is dried and evaporated, and 1-carbobenzoxyamino-5-(N-succinyl-hydroxylamino)-pentane (IV) obtained which, after being redissolved in ethyl acetate+methanol melts at 115° C. The yield is 70%.

(d)                      IV→V

A mixture of 2.865 grams of compound IV, 1.88 grams of dicyclohexyl-carbodiimide, and 50 cc. of absolute tetrahydrofuran is allowed to stand at room temperature for 2 days, the precipitated dicyclohexyl urea is filtered off and the filtrate evaporated in vacuo. The residue is taken up in ethyl acetate, and the solution allowed to stand in a refrigerator. The small quantity of dicyclohexyl urea which precipitates is filtered off, and the filtrate treated with ether after which the resulting N-(5'-carbobenzoxyamino-pentyl)-tetrahydro-3,6 - dioxo - 1,2-oxazine (V) separates in the form of colorless needles; melting point, 84–85° C.; yield 70%. When the reactions described under $(a)$–$(d)$ are performed without separation and purification of the intermediate products, the substance V is obtained in a total yield of 51%.

(e)    V→VI

A solution of 1.2 grams of compound and V and 1 gram of 1-amino-5-nitro-pentane hydrochloride in absolute methanol is treated with a solution of 0.32 gram of sodium methylate in methanol. The mixture is heated at about 50° C. for half an hour, and the precipitated sodium chloride then filtered off, and the filtrate evaporated under reduced pressure. The residue is crystallized from methanol+ethyl acetate to obtain 1-carbobenzoxyamino-5-[N-(5'-nitropentylamino - succinyl) - hydroxylamino]-pentane (VI) of melting point 114–116° C.; yield, 88%.

(f)    VI→VII

A solution of 0.85 gram of compound VI in 20 cc. of ethanol is stirred while being treated with 15 cc. of an ammonium chloride solution of 10% strength, which had been alkalinized with a few drops of aqueous ammonia, and with 0.5 g. of zinc dust. Stirring is continued for 20 minutes, the solution filtered, and the filtrate evaporated under reduced pressure. The residue is taken up in ethanol, filtered again, and the filtrate evaporated to dryness. The resulting 1-carbobenzoxyamino-5-[N-(5'-hydroxylamino-pentylamino-succinyl) - hydroxylamino]-pentane (VII) can be used without being purified.

(g)

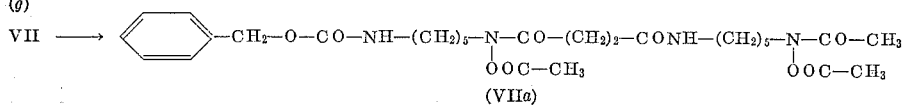

(VIIa)

The residue obtained according to $(f)$ is dissolved in 10 cc. of absolute pyridine and 2 cc. of acetic anhydride, and the solution allowed to stand at room temperature for 1 day. The reaction mixture is then evaporated under vacuum, the residue taken up in chloroform, the solution washed with dilute hydrochloric acid and sodium bicarbonate solution, then chromatographed on silica gel. Elution is performed with ethyl acetate+methanol 10:1, and the triacetyl compound VIIa obtained in a yield of 49% when the eluate is evaporated. NMR bands at 2.2 p.p.m. (twice O-acetyl) and 1.95 p.p.m. (once N-acetyl).

(h)

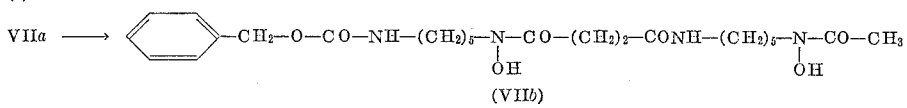

(VIIb)

A mixture of 0.15 gram of compound VIIa and 10 cc. of N-potassium hydroxide solution is allowed to stand at room temperature for 1 day, then neutralized with dilute hydrochloric acid, and evaporated under reduced pressure. The residue is taken up in warm ethyl acetate+methanol, the solution dried, concentrated and cooled, after which compound VIIb crystallizes. Melting point 165° C.; NMR bands at 1.95 p.p.m. (N-acetyl; yield, 79%).

When the reaction steps described steps described under $(e)$–$(h)$ are performed without purification and without isolation of the intermediate products, product VIIb is obtained in a total yield of 49%.

(i)
VIIb ⟶

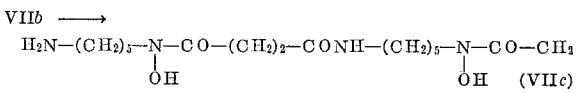

(VIIc)

0.5 gram of compound VIIb is dissolved in 50 cc. of ethyl acetate, 0.5 gram of palladium carbon added, and the mixture shaken in an atmosphere of hydrogen until the absorption of hydrogen ceases. The catalyst is then filtered off, the filtrate acidified slightly with methanolic hydrochloric acid, and evaporated under reduced pressure. The residue can be used without being further purified.

(k)    VIIc.HCl+V→IX→XII

A methanolic solution of equimolecular quantities of the hydrochloride of compound VIIc contained in the above residue, N-(5'-carbobenzoxyamino-pentyl)-tetrahydro-3,6-dioxo-1,2-oxazine, and sodium methylate is worked up as shown under $(e)$. It is then evaporated and the colorless residue taken up in ethyl acetate and chromatographed on silica gel. Elution is performed with a 1:1 mixture of ethyl acetate and methanol, and the main fraction subjected to hydrogenolysis as described under $(i)$. The solution is freed from the catalyst and evaporated.

(l)    XII→XIII

The residue obtained according to $(k)$ is taken up in water, the solution filtered through Celite to obtain a clear filtrate which is then treated with a ferric chloride solution, and the red-brown mixture allowed to stand for 1 hour before it is extracted three times with a 1:1-mixture of chloroform and phenol. The extracts are combined and washed with a small quantity of water, treated with diethyl ether, the resulting red-brown precipitate filtered off and washed with diethyl ether. The ferrioxamine-B-hydrochloride XIII so obtained is identical with authentic material. The total yield of stages $(i)$–$(l)$ is about 50%.

*Example 3*

650 mg. of ferrioxamine-B-hydrochloride and 82 mg. of anhydrous sodium acetate are dissolved in 10 cc. of methyl alcohol, and 9.5 cc. of acetic anhydride are added. After being allowed to stand for 4 hours at room temperature, the reaction mixture is evaporated to dryness in vacuo. The residue is dissolved in water and saturated with sodium chloride. The reaction solution is then extracted four times with chloroform. The cholorform extracts are washed twice with saturated sodium chloride solution, dried with sodium sulfate and evaporated in vacuo. There are obtained 550 mg. of a red-brown powder which in a paper chromatogram in two systems shows the same behaviour as ferrioxamine $D_1$, but is accompanied by small quantities of two by-products of which one migrates somewhat farther than ferrioxamine $D_1$ and the other not quite so far.

For the purpose of purification the acetylation product is chromatographed on a column of 280 grams of cellulose powder. The cellulose is first moistened with an aqueous sodium chloride solution of 10% strength. As eluant there is used the upper phase of a mixture of 50 parts of tertiary butanol, 25 parts of water, 25 parts of saturated sodium chloride solution and 1 part of 0.1 N-hydrochloric acid. Fractions of about 8 cc. are collected. Fractions 33–44 contain, in addition to ferrioxamine $D_1$, one impurity, and fractions 55–66 the other. Fractions 45–56 contain pure ferrioxamine $D_1$. They are evaporated to dryness in vacuo, the residue taken up in chloroform, and washed several times with saturated sodium chloride solution. The solution dried with sodium sulfate is evaporated to leave behind 226 mg. of an acetylation product which crystallizes from a mixture of methanol and ether in small red-brown needles. With a heatable polarization microscope the needles are observed to lose their double refraction at 170–172° C. and liquefy at about 197–205° C. to form a tough red-brown mass. Ferrioxamine $D_1$ which is obtained directly from Streptomyces pilosus extracts according to our aforementioned patent application behaves identically. A mixture of the two products shows no depression of the melting point. The infrared absorption spectra are identical. The acetylation product purified by crystallization is unitary when examined paperchromatographically and behaves like ferrioxamine $D_1$.

*Example 4*

A solution of 120 mg. of ferrioxamine-G-hydrochloride in 1 cc. of water and 35 cc. of dimethyl formamide is added dropwise to a mixture of 10 grams of dicyclohexylcarbodiimide in 25 cc. of dimethyl formamide, and the reaction mixture then allowed to stand at room temperature for 3 weeks. The dimethyl formamide is evaporated to a great extent under vacuum, the residue treated with 20 cc. of N-acetic acid while cooling with ice, and then allowed to stand overnight. The precipitated dicyclohexyl urea is filtered off with suction, and the filtrate evaporated under reduced pressure. The filtered dicyclohexyl urea still has a somewhat reddish coloration and is therefore recrystallized from ethanol. The reddish mother liquors are evaporated and the two evaporation residues combined. They are subjected to a distribution according to Craig: n-butanol:benzyl alcohol:0.001 N-hydrochloric acid: saturated sodium chloride 2:1:3:0.6 in 37 stages. The red substances are in the fractions 15–24: ferrioxamine E and
28–33: acetyl-ferrioxamine G.

Fractions 15–24 are combined and treated with diethyl ether to force the ferrioxamine E completely into the aqueous phase. The aqueous phase is treated with sodium chloride solution of about 20% strength, extracted with chloroform+phenol (1 cc.:1 g.) three times, and the extract rendered clear by filtration through a short column of Celite. The filtrate is treated with twice its volume of diethyl ether, extracted three times with a small quantity of water, the aqueous phases washed twice with ether, and then evaporated to dryness under reduced pressure. There remain 15 mg. of a red-brown amorphous powder which is crystallized from about 1 cc. of hot methanol. Ferrioxamine E is obtained is the form of red-brown needles which lose their double refraction at 280° C. and turn black without melting (same as the authentic material).

From fractions 28–33 there are obtained on working up in the same manner 100 mg. of crude N-acetyl-ferrioxamine G which has formed from unreacted starting material during the decomposition of the reaction mixture with acetic acid.

*Example 5*

A solution of 25 grams of ferrioxamine B-hydrochloride in 500 cc. of methanol is mixed with a solution of 50 grams of pure-8-hydroxyquinoline (twice recrystallized from aqueous ethanol) in 500 cc. of methanol. The mixture is kept for 4 to 5 hours at room temperature. The solution turns black and crystalline iron-hydroxyquinoline settles out; the whole is filtered through a glass suction filter (G4), rinsed with a small amount of methanol, and the blackish filtrate is evaporated under vacuum to dryness at 30 to 38° C. The residue is suspended in 300 cc. of water and agitated 5 to 6 times with 300 cc. of chloroform on each occasion, whereby blackish matter is transferred into the organic phase. The chloroform extracts are run through two separating funnels with 100 cc. of water and are then discarded. The aqueous phases, which are now of yellow color and free from hydroxyquinoline, are combined and evaporated to dryness at 40° C. under vacuum in a rotary evaporator. The crystalline, yellowish evaporation residue is recrystallized twice from water+methanol+acetone in the following manner:

1 gram of the substance is dissolved with heating in 5 cc. of methanol of 80% strength and rapidly mixed with 15 cc. of warm acetone. The slow crystallization takes 24 hours at room temperature, after which time the product is still faintly yellowish. A batch of 25 grams yields after two recrystallizations 18–19 grams of 30-methyl-7:18:29 - trihydroxy-8:11:29:22:30-pentaoxo-1:7:12:18: 23:29-hexaaza-triacontane hydrochloride.

*Example 6*

A solution of 300 mg. of ferrioxamine B-hydrochloride in 10 cc. of water is mixed with 20 cc. of N-sodium hydroxide solution and the precipitated ferric hydroxide is centrifuged off. The filtrate is immediately neutralized with N-hydrochloric acid. The resulting, substantially colorless solution is repeatedly agitated with n-butanol and the combined extracts are washed with a small amount of water. The butanol is evaporated under vacuum and there is obtained a crystalline yellowish residue which is purified as described in Example 5. The final product is identical with the substance obtained as described in Example 5.

*Example 7*

11.94 grams of 30-methyl-7:8:29-trihydroxy-8:11:19: 22:30-pentaoxo-1:7:12:18:23:29-hexaaza-triacontane hydrochloride and 1.64 grams of anhydrous sodium acetate are dissolved in 200 cc. of methanol by being boiled for a short time. The whole is then rapidly cooled to room temperature and treated immediately—that is to say before crystallization sets in—with 180 cc. of acetic anhydride. The mixture is kept for 17 hours with exclusion of moisture and then concentrated under vacuum to form an oily residue which is freed from acetic acid by being evaporated under vacuum with 2 x about 200 cc. of butanol. The oily residue, which consists mainly of the tetracetyl derivative is taken up in 200 cc. of methanol, saturated at 0° C. with ammonia, and then kept for 5 hours at room temperature and finally for 15 hours at 0° C. The resulting colorless crystallizate is freed from the ammoniacal solution by decantation and drying under vacuum; yield; 11.74 grams. After two recrystallizations from aqueous methanol of 60% strength there are obtained 9.12 grams of 1-acetyl-30-methyl-7:18:29 - trihydroxy - 8:11:19:22:30 - pentaoxo - 1:7: 12:18:23:29-hexaaza-triacontane which is identical with the product described in Example 8 insofar as its melting point, mixed melting point, infrared spectrum, color reactions, microanalysis and paperchromatography are concerned.

*Example 8*

A solution of 257 mg. of ferrioxamine $D_1$ in 20 cc. of water is treated with about 20 cc. of N-sodium hydroxide solution. The finely floccular iron hydroxide is removed in a centrifuge and the solution is rendered weakly acid with 2 N-hydrochloric acid. The solution is agitated three times with n-butanol and the extracts are washed with a small amount of water. After having evaporated the butanol under vacuum 1-acetyl-30-methyl-7:18:29-trihydroxy - 8:11:19:22:30 - pentaoxo - 1:7:12:18:23:29-hexaaza-triacontane as a crystalline residue which is recrystallized from much hot methanol to yield 170 mg. (=72% of theory) of a white, finely crystalline powder melting at 1850° C.

The $R_f$-value in n-butanol+glacial acetic acid+water (4:1:1) is 0.87 (the chromatogram is sprinkled with a 1% alcoholic solution of ferric chloride to render the substance visible).

*Example 9*

A solution of 200 mg. of ferrioxamine $D_1$ in 10 cc. of 6 N-hydrochloric acid is continuously extracted with ether for 2–3 hours. The aqueous solution, which by then has become colorless, is adjusted with sodium hydroxide solution to a pH value of about 4 to 5 and repeatedly agitated with n-butanol. When the butanol extracts are washed with water, evaporated and the residue is retrihydroxy - 8:11:19:22:30 - pentaoxo - 1:7:12:18:23:29-crystallized from methanol, 1-acetyl-30-methyl-7:18:29-hexaaza-triacontane formed is obtained as described in Example 8. Its properties are identical with those of the product described in Example 8.

*Example 10*

100 mg. of N-acetyl-ferrioxamine G are dissolved in 3 cc. of water and treated with N-sodium hydroxide solution. The precipitated ferric hydroxide is separated in a centrifuge and the solution acidified with hydrochloric acid. The reaction mixture is extracted with butanol and the butanol solution evaporated under reduced pressure to yield 1-acetyl-30-($\beta$-carboxyethyl)-7:18:29-trihydroxy-8:11:19:22:30 - pentaoxo - 1:7:12:18:23:29 - hexaaza-tricontane as an almost colorless, crystalline residue. After being recrystallized four times from methanol the very fine crystalline powder melts at 169–170° C.

The starting material may be obtained as follows:

750 liters of the active culture bouillon of Streptomyces pilosus A 21748 (NRRL 2857) obtained as described in the afore-mentioned patent application Serial No. 57,834, filed Sept. 22, 1960, now U.S. Patent 3,153,621 are treated with 750 grams of ferric sulfate in 7.5 liters of water and 15 kilos of Hyflo Supercel, and then filtered. The red-brown culture filtrate of 730 liters (pH 4.0) is treated with 131 kilos of sodium chloride and extracted in a ratio of approximately 20:1 with a mixture of phenol and chloroform (1 part by weight of phenol, 1 part by volume of chloroform). The 40 liters of the intensely red-brown extract are dried over anhydrous sodium sulfate and the dry extract introduced in the course of 60 minutes into a suspension consisting of 40 liters of ether, 200 liters of petroleum ether and 4 kilos of Hyflo Supercel. The filter cake is digested once with 25 liters of ether and twice with 25 liters of ether and acton (3:1, vol.:vol.) to remove the phenol. The Hyflo adsorbate is then digested seven times with 15 liters of methanol for ½ hour at room temperature each time. The dark red to orange colored extracts are combined and concentrated to 1 liter at a maximum temperature of 25° C. The concentrate is introduced with stirring into a suspension of 4 liters of ether, 4 liters of petroleum ether and 600 grams of Hyflo Supercel. The suspension is filtered with suction, the filter cake washed free from phenol with ether and a mixture of ether and acetone and the Hyflo adsorbate again eluted with methanol. The methanol eluate is then evaporated to dryness in a rotary evaporator at a maximum temperature of 25° C. The yield of foamy, red-brown dry product is 369 grams.

The two filtrates obtained by precipitating the substances with mixtures of ether and petroleum ether on to Hyflo Supercel and subsequent filtration are extracted with a little water to obtain the material still dissolved therein (it is more particularly the more lipophilic ferrioxamines that are concentrated). The aqueous extracts are saturated to two-thirds with sodium chloride, extracted with a small amount of a mixture of phenol and chloroform and processed as described above. The yield is 20 grams of a red, greasy substance. The latter is processed together with the above product.

13 liters of Dowex 50–WX2 (sulfonated polystyrene, cross-linked with 2% of divinylbenzene), 100/200 mesh in the $NH_4^+$ form are conditioned while being cooled with water (12–14° C.) in a glass column of 10 cm. internal diameter (resin height 170 cm.) for 24 hours with 0.1– molar ammonium acetate buffer of pH 4.5 at a perfusion rate of 3.0 liters per hour.

389 grams of crude ferrioxamine mixture are introduced in the course of 1 hour with stirring into 3.5 liters of 0.1-molar ammonium acetate buffer. The turbid mixture is filtered through a glass frit G4. The residue is stirred twice for one hour each time with 500 cc. of fresh buffer. About 10% remains undissolved. The conditioned resin is cautiously covered with the dark red solution. The solution is allowed to trickle in at the rate of 1.5 liters per hour and is rinsed with 5 liters of 0.1-molar buffer in portions. The chromatogram is then developed for 86 hours at a rate of 1.5 liters per hour with 0.1-molar buffer and then for 18 hours at a rate of 3 liters per hour with 0.3-molar buffer.

Ferrioxamine G is enriched in fraction I (100–140 liters). Fraction II (140–180 liters) contains chiefly ferrioxamine B. The eluates from the fraction volumes of 100–140 liters are combined. Working up is performed by partial saturation with sodium chloride. Extraction with a mixture of phenol and chloroform, removal of the ammonium acetate buffer by washing the extract with an 0.01 N-hydrochloric acid which contains 10% of sodium chloride, precipitation with ether and petroleum ether in the presence of Hyflo Supercel, extraction with methanol and evaporation of the solution as described above yield 7.9 grams of substance enriched in ferrioxamine G.

4 grams of the substance obtained from fraction I are dissolved in 25 cc. of 0.1-molar ammonium acetate buffer (pH 4.6–4.7) and poured on to a column of Dowex 50–WX2 (100/200 mesh) in the ammonium salt form; dimensions of the column; 3 cm. diameter, 57 cm. height. On elution with ammonium acetate buffer the brown dyestuff is separated into two zones. The first zone is eluted with 0.1-molar ammonium acetate buffer and the second with 0.3-molar ammonium acetate buffer.

Thte eluates are worked up separately by being treated with approximately 20% of sodium chloride and extraction with a mixture of phenol and chloroform (1 kilo of phenol to 1 liter of chloroform). The extracts are washed three times with 0.01 N-hydrochloric acid containing sodium chloride and filtered through a small Celite column to give a clear solution.

After being diluted with an equivalent volume of ether the active substance is again taken up in water; the aqueous solutions are washed twice with ether and then evaporated to dryness under reduced pressure. Two ferrioxamine hydrochlorides are obtained in the form of amorphous red-brown powder.

The first zone yields 2.28 grams of ferrioxamine G hydrochloride, the second 0.92 gram of ferrioxamine B hydrochloride. The latter can be identified by paperchromatography of the hydrochloride and the N-acetyl derivative (ferrioxamine $D_1$).

535 mg. of ferrioxamine G hydrochloride are dissolved in 10 cc. of methanol; 100 mg. of anhydrous sodium acetate and 9 cc. of acetic anhydride are added and the whole allowed to stand for 4 hours. The reaction mixture is evaporated to dryness under reduced pressure, the residue taken up in water and the solution saturated with sodium chloride. On being extracted several times with chloroform the bulk of the brown pigment (acetylation product) passes into the organic phase. Small quantities of starting material and degradation products remain dissolved in the water.

The chloroform extracts are washed twice with sodium chloride solution, dried over sodium sulfate and evaporated under reduced pressure to yield 483 mg. of amorphous brown residue.

On recrystallization from a mixture of methanol and ether amorphous flakes precipitate at first. After these have been separated off, the mother liquors, on the further addition of ether, yield N-acetyl-ferrioxamine G in the form of fine, red-brown prisms melting at 201–206° C (microscope). Double refraction remains until the product melts, whereas in the case of the similarly melting ferrioxamine $D_1$ it disappears at about 170° C. Altogether, 250 mg. of crystalline acetylation product are obtained.

*Example 11*

1 - acetyl - 30 - ($\beta$ - carbomethoxy - ethyl) - 7:18:29-trihydroxy - 8:11:19:22:30 - pentaoxo - 1:7:12:18:23:29-hexaaza-triacontane may be prepared by reacting N-acetyl-ferrioxamine G methyl ester with sodium hydroxide solution in a manner analogous to that described in Example 6 or 8.

The starting material may be obtained, for example, as follows:

67 mg. of N-acetyl-ferrioxamine G are dissolved in 5 cc. of methyl alcohol and 2 cc. of an ethereal solution of diazomethane of about 2% strength are added. After 30 minutes the reaction mixture is evaporated under reduced pressure and the residue recrystallized from a mixture of methanol and ether. The resulting N-acetyl-ferrioxamine G-methyl ester melts at 194–199° C.

*Example 12*

11.94 grams of 30-methyl-7:18:29-trihydroxy-8:11:19:-22:30 - pentaoxo - 1:7:12:18:23:29 - hexaaza - triacontane hydrochloride are suspended in 200 cc. of water. The mixture is then adjusted to pH 9 with sodium hydroxide solution and with portions of 2.4 cc. of N-valeric acid chloride while being strongly agitated and stirred with a vibromixer. Simultaneously the mixture is maintained at pH 9 by the dropwise addition of 5 N-sodium hydroxide solution. After the addition of the first two portions of the acid chloride an oily product precipitates from the powdery suspension. 200 cc. of chloroform are added, the mixture separating into 2 clear phases which are intensively mixed during the further reaction. After the addition of a total of 16 cc. of N-valeric acid chloride and a total of approximately 38 cc. of 5 N-sodium hydroxide solution, the reaction mixture is stirred for another 15 minutes. The phases are then separated. The aqueous phase is extracted with 3 x 200 cc. of chloroform. The combined chloroform phases are washed with saturated potassium bicarbonate and with saturated sodium chloride solutions, dried over sodium sulfate and evaporated to a syrup under reduced pressure. The oily residue (29 grams) is taken up in 500 cc. of methanol, the solution saturated at 0° C. with ammonia gas and then allowed to stand for 16 hours at 25° C. The reaction mixture is then evaporated to dryness and thoroughly dried in a high vacuum. The crystalline residue (16.4 grams) is boiled in acetone, the mixture allowed to stand for 15 hours at 0° C. and then filtered. The separated white crystalline powder is recrystallized from a mixture of 150 cc. of water and 70 cc. of n-propanol at 100° C. to yield 1-valeryl-30-methyl-7:18:29-trihydroxy-8:11:19:22:30 - pentaoxo - 1:7:12:18:23:29 - hexaaza-triacontane as a colorless crystallizate melting at 181–183° C.

In contrast to the starting material, the resulting compound is difficultly soluble even in hot water. It does not dissolve readily in most of the ordinary organic solvents either, but can be dissolved in mixtures of water and organic solvents with heating.

*Example 13*

5.97 grams of 30-methyl-7:18:29-trihydroxy-8:11:19:22:30-pentaoxo-1:7:12:18:23:29 - hexaaza - triacontane hydrochloride are suspended in 40 cc. of water and 50 cc. of dioxane; the suspension is adjusted to pH 9 with 5 N-sodium hydroxide solution with strong agitation in the vibromixer and then treated with 10 cc. portions of a solution of 18.18 grams of stearic acid chloride in 60 cc. of dioxane. The pH of the mixture is maintained at 9 by the dropwise addition of 5 N-sodium hydroxide solution. After the addition of 4 portions of stearic acid chloride solution, the reaction mixture is treated with 50 cc. of water and 200 cc. of chloroform. The mixture separates into two clear phases which are intensively mixed for the further reaction by being strongly agitated in the vibromixer. After completion of the addition of the acid chloride, the reaction mixture is stirred for another hour at pH 9. It is then diluted by the addition of 500 cc. of water and 1 liter of chloroform, the phases separated and the aqueous phase extracted twice with 250 cc. of chloroform each time. The combined chloroform phases are washed with saturated potassium bicarbonate and sodium chloride solutions, dried over sodium sulfate and evaporated. The crystalline residue is dissolved in 500 cc. of ether, the solution treated with 200 cc. of methanol and saturated at room temperature with ammonia gas. After being allowed to stand for 3 days at room temperature the reaction mixture is evaporated to dryness under reduced pressure and the residue boiled several times with petroleum ether to remove stearic acid amide. The remaining colorless crystalline powder (4.3 grams) is recrystallized from aqueous n-propanol of 66% strength. The resulting 1-stearyl-30-methyl-7:18:29-trihydroxy-8:11:19:22:30 - pentaoxo - 1:7:12:18:23:29-hexaaza-triacontane melts at 194–196° C. It is sparingly soluble in water and the ordinary organic solvents.

In an analogous manner by reaction with the appropriate acid chlorides or acid anhydrides 1-$R_1$-30-methyl-7:18:29-trihydroxy - 8:11:19:22:30 - pentaoxo-1:7:12:18:23:29-hexaaza-triacontane may be prepared in which $R_1$ represents the formyl, propionyl, n-butyryl, oleyl, succinyl, glutaryl, salicyl, p-hydroxybenzoyl or p-aminosalicyl radical or the radical of the formula

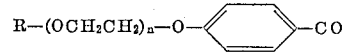

in which R stands for methyl or ethyl and $n$ is a number from 1 to 9.

*Example 14*

(a) 3.0 grams of 2-(5-carbobenzoxy-aminopentyl)-3:6-dioxo-tetrahydro-1:2-oxazine are heated for 15 minutes on a water-bath with 1 ml. of anhydrous triethylamine in 50 ml. of absolute methanol. The reaction mixture is evaporated in vacuo and the residue dissolved in chloroform and washed with dilute hydrochloric acid and sodium bicarbonate solution. The product, which remains on evaporation of the chloroform, is recrystallized from a mixture of ethyl acetate and ether to yield 2.9 grams (82%) of 1 - carbobenzoxy - amino-5-(N-succinyl-hydroxylamino)-pentane methyl ester melting at 75–76° C.

(b) 2.5 grams of the above carbobenzoxy derivative are hydrogenated for 3½ hours in 75 ml. of methanol with 500 mg. of a palladium carbon catalyst of 10% strength in a current of hydrogen. 1 equivalent of hydrogen chloride in dry methanol is added in 4 portions in the course of hydrogenation. The solution filtered off from the catalyst is cautiously concentrated and ether is added. There are obtained 1.68 grams (93%) of 1-amino-5-(N-succinyl-hydroxylamino) - pentane methyl ester hydrochloride in the form of lustrous crystals which are recrystallized from a mixture of methanol and ether for the purpose of analysis; M.P. 102–103° C.

(c) 1.5 grams of the hydrochloride of the above amino compound are treated with 0.35 gram of sodium methoxide in a little methanol. The solution separated from the precipitated sodium chloride is evaporated in vacuo. The residue is dissolved in absolute tetrahydrofuran and heated with 2.0 grams of 2-(5-carbobenzoxy-aminopentyl)-3:6-dioxo-tetrahydro-1:2-oxazine for 15 minutes on a waterbath. After evaporation of the solvent, the resinous residue is crystallized from ethyl acetate and recrystallized from a mixture of methanol and ethyl acetate to yield 2. 215 grams (67%) of 1-carbobenzoxy-amino - 6:17-dihydroxy-7:10:18-trioxo-20-carbomethoxy-6:11:17-triaza-eikosan; M.P. 129–131° C.

(d) 1.7 grams of the carbobenzoxy derivative described in (c) are decarbobenzoxylated in the conventional manner by catalytical hydrogenation in 200 ml. of methanol with the addition of methanolic hydrochloric acid. The solution is separated from the catalyst, concentrated and treated with ether to yield 1.37 grams (97%) of fine crystals which are 1-amino-6:17-dihydroxy-7:10:18-trioxo-20-carbomethoxy-6:11:17-triaza-eikosan hydrochloride. The product is recrystallized from a mixture of methanol and ether; M.P. 131–133° C.

(e) 1.1 grams of the hydrochloride of the amino compound described in (d) are heated for 15 minutes on a water-bath with 0.125 gram of sodium methoxide and 0.80 gram of 2-(5-carbobenzoxy-aminopentyl)-3:6-dioxotetrahydro-1:2-oxazine in 20 ml. of absolute methanol. The sparingly soluble 1-carbobenzoxy-amino-6:17:28-trihydroxy-7:10:18:21:29-pentaoxo - 31 - carbomethoxy-6:11:17:22:28-pentaza-hentriakontan crystallizes out of the reaction mixture and is recrystallized first from aqueous methanol and then from methanol. Yield: 0.75 gram (42%); M.P. 163–165° C.

(f) By catalytical decarbobenzoxylation there is obtained from 0.60 gram of the carbobenzoxy derivative described in (e) 0.465 gram (89%) of a product melting unsharply at 135–140° C. after precipitation from a mixture of methanol and ether. It is 1-amino-6:17:28-trihydroxy-7:10:18:21:29-pentaoxo - 31 - carbomethoxy-6:11:17:22:28-pentaza-hentriakontan hydrochloride.

(g) 0.30 gram of the hydrochloride described in (f) is acetylated for 24 hours with acetic anhydride and pyridine in the cold. The yellowish product, which is obtained after working up in the customary manner, is chromatographed on 50 times its quantity of silica gel. The fractions eluted with a mixture of chloroform and methanol (19:1), which are unitary in the thin-layer chromatograph, are allowed to stand overnight in a refrigerator in 10 ml. of methanol with 5 ml. of saturated potassium bicarbonate solution. On acidification and evaporation in vacuo, crystalline 30-(β-carboxyethyl)-7:18:29-trihydroxy-8:11:14:22:30 - pentaoxo - 1:7:12:18:23-29-hexaaza-triacontan of the formula

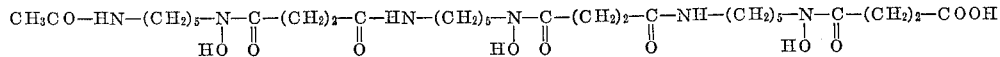

precipitates. For the purpose of analysis the product is recrystallized from methanol; M.P. 185° C.

(h) 0.10 gram of the above hydrochloride is allowed to stand for three days with 2 ml. of 2 N-potassium hydroxide solution, acidified, treated with ferric chloride, buffered with sodium acetate and the ferric complex extracted with a mixture of phenol and chloroform (1:1). The extracts are washed several times with saturated sodium chloride solution and 0.01 N-hydrochloric acid and dried with sodium sulphate. The ferric complex is driven into the aqueous layer by the addition of ether, the aqueous layer is extracted with ether to remove the phenol and then evaporated in vacuo. The evaporation residue is dissolved in methanol and precipitated with ether. Yield: 77 mg. of an amorphous red-brown powder whose infrared absorption spectrum and paper-chromatographic behaviour are identical with those of authentic ferrioxamine G.

What is claimed is:

1. N-(5-$R_1$-amino-pentyl)-tetrahydro-3:6-dioxo - 1:2-oxazine of the formula

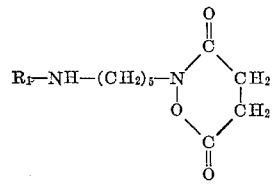

in which $R_1$ stands for a member selected from the group consisting of hydrogen, alkanoyl having 1 to 18 carbon atoms, alkenoyl having 1 to 18 carbon atoms, succinyl, lower alkanol-esterified succinyl, glutaryl, natural α-aminoacyl, benzoyl, salicyl, p-hydroxy-benzoyl, p-amino-salicyl, p-methoxy-benzoyl, p-ethoxybenzoyl, p-ethoxy-ethoxy-benzoyl, p-ethoxy-polyethyleneoxy-benzoyl, naphthoyl, phthaloyl, carbobenzoxy and phenylacetyl.

2. $N_1$ - hydroxy-$N_1$-(5-$R_1$-amino-pentyl)-$N_2$-[5-(tetrahydro-3:6-dioxo-1:2-oxazino)-pentyl]-succinic acid diamide of the formula

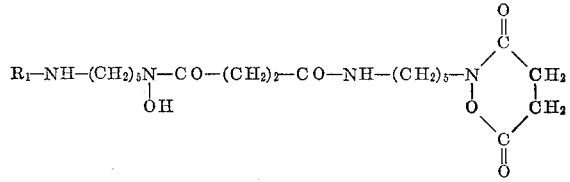

in which $R_1$ stands for a member selected from the group consisting of hydrogen, alkanoyl having 1 to 18 carbon atoms, alkenoyl having 1 to 18 carbon atoms, succinyl, lower alkanol-esterified succinyl, glutaryl, natural α-amino-acyl, benzoyl, salicyl, p-hydroxy-benzoyl, p-aminosalicyl, p-methoxy-benzoyl, p-ethoxybenzoyl, p-ethoxyethoxy-benzoyl, p-ethoxy-polyethyleneoxy-benzoyl, naphthoyl, phthaloyl, carbobenzoxy and phenylacetyl.

3. The O-acyl derivative of the compound of claim 2, in which acyl is a member selected from the group consisting of acetyl and benzoyl.

References Cited by the Examiner

UNITED STATES PATENTS

| | | | |
|---|---|---|---|
| 2,940,971 | 6/1960 | Lott | 260—244 |
| 2,974,140 | 3/1961 | Croxall et al. | 260—244 |
| 3,024,407 | 3/1962 | Major et al. | 260—559 |
| 3,036,128 | 5/1962 | Moffett | 260—559 |

WALTER A. MODANCE, *Primary Examiner.*

NICHOLAS S. RIZZO, *Examiner.*